United States Patent Office

Re. 26,216
Reissued May 30, 1967

26,216

BRIGHT FINISHED ALUMINUM ALLOY SYSTEM

John B. English, Tokyo, Japan, assignor to Reynolds Metals Company, Richmond, Va., a corporation of Delaware No Drawing. Original No. 3,164,494, dated Jan. 5, 1965, Ser. No. 63,503, Oct. 19, 1960. Application for reissue May 11, 1966, Ser. No. 552,674
15 Claims. (Cl. 148—31.5)

Matter enclosed in heavy brackets [ ] appears in the original patent but forms no part of this reissue specification; matter printed in italics indicates the additions made by reissue.

This invention relates to chemical and electrolytic brightening of aluminum and aluminum alloys, and particularly concerns an improved aluminum alloy and metallurgical technique for obtaining a brightly reflective and yet relatively heavily anodized article.

The production of decorative, anodized aluminum articles has been known in the art for many years. The lustrous surface has an attractive appearance, and the anodized coating overlying the reflective metallic surface has the advantage of furnishing a hard-surfaced protective coating to preserve the bright aluminum substrate. Such an anodized coating is not itself reflective, but is generally transparent so that light can be reflected through it.

It has been found, however, when using conventional alloys and practices, that the reflectance of an anodized article progressively diminishes to a noticeable extent as the thickness of the anodized coating is increased. In an effort to preserve most of the bright reflective qualities of the anodized article, while still retaining some anodized coating for protective purposes, it has usually been accepted in the trade that the anodized coating should be limited to a thickness of about 0.2 mil (0.002″), even though it has been recognized that a thicker coating would be desirable for better protection.

It is recognized, further, that a substrate of pure aluminum is superior to its alloys when brilliance of surface appearance is desired. This results, probably, from two circumstances: the brightness of an anodized article depends not only upon the transparency of the coating, but also upon the surface regularity of the metallic substrate. Impurities or alloying constituents create the possibility of both inclusions in the anodized coating and pitting or other surface irregularities on the substrate. Of course, ultra high-purity aluminum is extremely expensive, and it lacks various physical properties which may be required for a given application. The use of magnesium as a suitable alloying element is known to yield satisfactory strength characteristics, but the quantity of that element has necessarily been restricted due to its deleterious effect on surface finish.

Limited by these competing considerations, art improvements have emphasized the techniques of the finishing process, such as anodizing. In contrast, the present invention is directed to a solution of the fundamental problem concerning optimum alloy constituency of the base metal to be anodized.

The object of this invention, then, was to construct an alloy (preferably within the purity limits attainable with commercial reduction cells) which would present an anodized surface comparable to that previously produced only with higher purity aluminum. As a corollary, it was desired that the alloy be responsive to a wide range of commercial finishing processes.

In accordance with the present invention, it is possible to follow conventional mill and finishing practices, in producing anodized aluminum articles, but the thickness of the anodized coating can be progressively increased with substantially less progressive decreases of reflectivity than has been achieved in the art heretofore without the use of refined aluminum. Basically, the invention derives from the discovery that purity alone is not the controlling factor; that certain impurity elements are much more critical that others; and that the removal of all impurities is simply an expensive method employed of necessity because the critical elements were not recognized.

More particularly, I have found that control of the manganese constituent, according to the instant teaching, is the dominant factor in obtaining a vastly improved result. Additionally, certain novel steps in the manufacturing technique have been found to significantly influence the response of the alloy to bright finishing procedures.

The control of manganese and other constituents in accordance with the invention has proved broadly successful toward improving the types of alloys which are presently preferred in the trade for brightly reflective anodized articles, viz, the 5X57 series (Aluminum Association designation).

The published compositions of several 5X57 alloys are given below.

| Constituents | 5357 | 5457 | 5557 |
|---|---|---|---|
| Silicon | .12% max | .08 max | .10 max. |
| Iron | .17 max | .10 max | .12 max. |
| Copper | .07 max | .20 max | .15 max. |
| Manganese | .15-.45 | .15-.45 | .10-.40 |
| Magnesium | .80-1.2 | .80-1.2 | .40-.80 |
| Others, each | .05 max | .03 max | .03 max. |
| Others, total | .15 max | .10 max | .10 max. |
| Aluminum | Bal | Bal | Bal. |

THE METHOD USED TO EVALUATE REFLECTIVE CHARACTERISTICS

The light reflecting characteristics of metallic surfaces can be used as a tool for measuring and controlling quality and uniformity, and also as a method of differentiating surface finishes. Visual methods of evaluating such surfaces, though generally quite sensitive, may be influenced by psychological factors such as color, physical surroundings, shape and personal preference. In addition, the sensitivity of the human eye and its resolving power affect the visual appearance of surfaces. With this in mind, an instrumental technique has been developed which makes possible the measurement of small differences in the reflectance characteristics of surfaces.

When an incident light beam strikes a surface, the intensity, distribution and color of the reflected light are a measure of the nature of the surface. Instruments for the photometric measurement of opaque surfaces typically consist of a suitable light source, an integrating light sphere, a photoelectric cell, signal multiplier, and recording or indicating equipment. The incident light beam is allowed to fall on the sample, and the reflected light is automatically integrated inside a magnesium oxide coated sphere. The average light density, as measured by the photometer, indicates the quantity of the reflected light. A suitable light source consists of an incandescent gas-filled tungsten lamp combined with a double conversion filter to give a luminous flux (incident light) equal in energy distribution to the sensitivity of the eye. Such a light source is employed in the modified Gardner Pivotable Sphere Hazemeter which was used to determine the characteristics reported herein. The conversion filter employed consists of two bonded glass plates (blue and amber) designed to give a transmittance curve closely approximating the visual response of equal energy light at various wave lengths. With this filter, surfaces having different lusters can be measured and the result compared with visual impressions.

The pivotable integrating sphere allows the angle of incident light to be varied from normal (or perpendicular)

to the sample surface to a second value which is usually less than 10° from the normal. In the second position, virtually all reflected light is retained inside the sphere. When the angle of incidence is 0° (perpendicular to the surface), only the diffuse or scattered light is retained inside the sphere and the specular reflection is emitted outside the sphere.

The intensity of the reflected light from any particular light source, as measured on an instrument as described, may be evaluated under the following definitions:

(1) Total reflectance (TR%): The percent intensity of the incident light reflected from a flat opaque surface at all angles of observation.
(2) Diffuse reflectance (DR%): The percent intensity of the incident light reflected from a flat opaque surface at all angles and planes, other than the portion of the light reflected at an angle equal to the incident beam and in the same plane to the normal.
(3) Specular reflectance (SR%): The percent intensity of the incident light reflected at an angle equal to the incident beam and in the same plane.

Thus, the sum of SR+DR=TR or specular and diffuse components equal the total reflectance. In measuring these components, the angle of incidence should be less than 10° (as measured from the normal).

A perfectly diffuse surface would scatter or diffuse the incident light at all positions (angles) of the sphere giving identical readings for both TR and DR. In contrast, a specular surface would reflect substantially all of the incident light, if the incident light is normal to the surface, and give extremely low DR. If the angle of incidence has a value other than 0°, all of the reflected light (TR) is retained in the sphere. The two readings TR and DR, therefore, distinguish all surfaces if the illuminant and angle of incidence (for TR readings) are kept constant. The difference TR−DR, referred to as the specular component of the reflected light, is then readily calculated.

The generally adopted standard of reflectance consists of a specially prepared magnesium oxide surface. The preparation of this standard is outlined in ASTM Specification D986–50. This surface (a perfect diffuser) is considered to give 100% reflectance (TR% and DR%). In order to balance the measuring circuit of the instrument, a black standard is used to define 0% reflectance. This standard consists of a black dyed velvet surface providing a nearly perfect light trap and has an absolute reflectance of 0.4%. Under some circumstances, it has been found to be advantageous to use an etched aluminum surface for an 80% reflectance standard, together with a black polished glass for 0% standard. This latter system of secondary standards is the basis upon which the data herein was determined.

Certain additional definitions are essential to an understanding of the significance of the accompanying data. "Specular reflectance" is defined as the ability of a plain surface to reflect an image without distortion.

Specular reflectance factor (SRF%) is a measure of the ratio of specular reflectance to total reflectance. By reporting the TR and DR readings, the average reader will only with difficulty comprehend the real specularity of a surface whereas the "specular reflectance factor" is a direct measure of the mirror qualities of the surface. As an example, a sample of highly specular aluminum showed these readings as compared to polished chrome plate:

| | TR percent | DR percent | SRF percent |
|---|---|---|---|
| Aluminum | 87.5 | 12.5 | 90.8 |
| Chrome | 67.5 | 9.5 | 90.9 |

Since the two surfaces are equally specular, some unit is needed to distinguish the difference in specular or image brightness, which is defined as follows:

Specular brightness factor (SBF%) is that percentage of the incident light falling upon the surface which is reflected at the same angle as that of the incident ray. These angles and the normal must lie in the same plane. The following values may then be calculated for the standard silver mirror and the previously mentioned aluminum and chrome surfaces:

| | TR, percent | DR, percent | SRF, percent | SBF, percent |
|---|---|---|---|---|
| Silver Mirror | 91.5 | 5.0 | [1] 100 | [1] 100 |
| Aluminum | 87.5 | 12.5 | 90.8 | 87.0 |
| Chrome | 67.5 | 9.5 | 90.9 | 67.3 |

[1] Arbitrarily.

From the above discussion, it follows that specular surfaces should be reported in terms of specular reflectance (SRF≡image quality) and specular brightness (SBF≡image brightness)

As an additional example, two commercial mirrors (silver and lead sulfide) gave identical SRF readings of 96% but had SBF values of 92% and 45% respectively.

The following equations are employed to compute the two factors used herein to differentiate the various surfaces discussed:

(a)

$$SRF\% = 100 \cdot \left( \frac{TR - DR + \left( \frac{TR - DR}{TR' - DR'} \right) \cdot DR'}{TR} \right)$$

or if the instrumental corection factor "C" has been determined using the specular standard, $$SRF\% = 100 \cdot \frac{[(TR - DR)(1 + C)]}{[TR]}$$

Also, (b)

$$SBF\% = \left( \frac{100}{TR' - DR'} \right) \cdot (TR - DR)$$

where TR and DR are the previously defined reflectance readings; TR′ and DR′ are the corresponding readings for the standard; and $$C = \frac{DR'}{TR' - DR'}$$

The following examples furnish specific illustrations of present preferred embodiments of the invention.

Example I

An alloy was made consisting of .03% copper, .08% iron, .05% silicon, .03% manganese, and 0.80% magnesium, the balance being substantially aluminum (other constituents each being no more than .02% and totaling less than .05%). A standard sheet ingot of this alloy was cast by conventional D.C. casting methods, and homogenized in the temperature range 1100–1175° F. for a period of several hours in order to obtain satisfactory grain size control and uniformity of structure. The ingot was then scalped to remove surface irregularities and then hot-rolled (750–900° F.) in a slabbing mill. The slabbed ingot was then cooled to about 525–575° F. and given an additional reduction in thickness while the metal temperature was above about 350° F. The ingot thickness was reduced from approximately 15 inches to about 1 inch in the hot-rolling step, and to about 0.15 inch in the subsequent rolling. Thereafter, the sheet was brought to a finished gage of about .040 inch by means of a conventional cold-rolling operation. Portions of the sheet were tempered to approximately H25 condition, while others were annealed. The sheet portions were finished by conventional mechanical buffing, then solvent degreased, bright dipped in a nitric acid solution, and anodized with 15%–18% sulfuric acid in deionized water at 65–75° F., using 10–15 amperes per square foot for different periods of time (ranging from about 8 minutes to 80 minutes) for different specimens in order to produce anodized coatings of various thicknesses on the respective specimens. The coatings were all sealed in deionized water at 210–212° F.

The reflectance characteristics of the specimens are tabulated below. The values for 0-temper material are given in Table 1, while Table 2 presents similar information for H25 temper material.

TABLE 1

| Approximate Thickness of Anodic Coating (Mils) | Image Reflecting Characteristics | |
|---|---|---|
| | Quality, SRF, Percent | Brightness, SBF, Percent |
| 0.1 | 90.3 | 76.4 |
| 0.2 | 91.7 | 76.9 |
| 0.3 | 91.8 | 77.8 |
| 0.4 | 91.0 | 75.9 |
| 0.5 | 89.0 | 74.5 |
| 0.6 | 92.0 | 72.8 |
| 0.7 | 90.2 | 75.2 |
| 0.8 | 87.9 | 72.0 |
| 0.9 | 86.9 | 71.3 |
| 1.0 | 88.6 | 72.2 |

For comparison, specimens of 5457 alloy produced by conventional procedures typically exhibit much poorer characteristics as the coating thickness is increased to one mil, viz. down to about 79 (SRF%) and about 60 (SBF%). However, by utilizing the procedures as specified in Example I, especially the intermediate "warm-cool" rolling, the results for even 5457 alloy can be improved to maximums of about 87 (SRF%) and 73 (SBF%) and minimums, respectively, of about 81 and 64. Thus, the remarkable characteristics tabulated in Table 1 are attributable both to the improved fabrication practice and to the improved alloy composition.

TABLE 2

| Approximate Thickness of Anodic Coating (Mils) | Image Reflecting Characteristics | |
|---|---|---|
| | Quality, SRF, Percent | Brightness, SBF, Percent |
| 0.1 | 91.8 | 78.5 |
| 0.2 | 92.3 | 79.1 |
| 0.3 | 92.7 | 78.8 |
| 0.4 | 91.5 | 77.3 |
| 0.5 | 91.9 | 77.6 |
| 0.6 | 90.8 | 76.3 |
| 0.7 | 85.7 | 71.0 |
| 0.8 | 84.3 | 69.4 |
| 0.9 | 88.2 | 72.3 |
| 1.0 | 88.1 | 71.5 |

Certain comparisons again indicate the superiority of the alloy and practice described in Example I. For example, tempered 5457 alloy (approximately half hard) exhibits characteristics ranging down to about 80 (SRF%) and 64 (SBF%) as the coating thickness is increased to about 1 mil. The corresponding values for 5357 alloy are about 66 (SRF%) and 50 (SBF%); and the characteristics for that alloy seldom exceed 73 and 61, respectively, even for a 0.1 mil surface coating.

Another comparative reference of interest is high purity aluminum (generally referred to as "four nine" metal) which has an aluminum content of at least 99.99% and is generally produced by expensive refining processes. When this material is fabricated by conventional techniques, its image characteristics are typically about 90 (SRF%) and 78 (SBF%) for H25 temper. It is apparent, therefore, that the alloy and fabricating practice of the present invention are capable of producing a surface finish substantially equivalent to those previously attainable only with more expensive high purity aluminum.

Example II

An alloy similar to that in Example I was prepared in the same manner, but having the following spectrographic analysis:

| Cu | Fe | Si | Mn | Mg | Zn | Ni | Cr | Ti | Al |
|---|---|---|---|---|---|---|---|---|---|
| .06 | .07 | .05 | .01 | .75 | .00 | .00 | .00 | .01 | BAL. |

Table 3 presents the image characteristics which were observed in the case of the Example II alloy.

TABLE 3

| Approximate Thickness of Anodic Coating (Mils) | Image Reflecting Characteristics | |
|---|---|---|
| | Quality, SRF, Percent | Brightness, SBF, Percent |
| 0.2 | 93 | 79 |
| 0.4 | 91 | 77 |
| 0.6 | 92 | 76 |
| 0.8 | 90 | 73 |
| 1.0 | 91 | 73 |

The specimens of Example II were produced in H25 temper, and therefore the results shown in Table 3 correspond to those of Table 2. It is readily apparent from a comparison of Tables 2 and 3 that the results achieved with the alloys of Examples I and II are equivalent. It should be noted that the increase in the copper content of the Example II alloy apparently had no deleterious effect on the brightness of the finished sheet.

Analyses of variant forms of the Example II alloy, which showed comparable characteristics, are the following:

| | Cu | Fe | Si | Mn | Mg | Zn | Ni | Cr | Ti | Al |
|---|---|---|---|---|---|---|---|---|---|---|
| (1) | .03 | .07 | .05 | .00 | .71 | .00 | .00 | .00 | .02 | BAL. |
| (2) | .02 | .07 | .04 | .01 | .85 | .01 | .00 | .01 | .01 | BAL. |

The sheet of alloy (1) above was produced in .070 inch thickness, while that of alloy (2) was .125 inch.

In order to evaluate the critical upper limit of copper, additional tests were made using alloys within the general designation: aluminum and 0.60–1.0% magnesium, up to 0.12% iron, up to .08% silicon, manganese .03% max. and varying amounts of copper. It was found that .08% copper did not detract appreciably from the brightness of the finished alloy. In fact, as much as 0.15% copper was indicated to be satisfactory provided the metal was annealed; however, tempered stocks (such as H25) exhibited an undesired hazing or clouding when the copper content reached this level.

In addition, the presence of small amounts of zinc, nickel, chromium, and titanium (within the broad limits of .03% each and 0.10% total) did not significantly affect the brightness characteristics. Beyond such limits, however, additions of chromium have progressively detrimental effects upon surface brightness. For example, additions of .05% and 0.10% chromium to an alloy such as that of Example I result in characteritics not differing substantially from those attainable with conventional alloy 5457.

Example III

In order to evaluate the influence of iron and silicon, as well as the general impurity level, an alloy was prepared in the manner described in Example I, having the following analysis:

| Cu | Fe | Si | Mn | Mg | Zn | Ni | Cr | Ti | Al |
|---|---|---|---|---|---|---|---|---|---|
| .02 | .12 | .07 | .01 | .75 | .02 | .00 | .01 | .03 | BAL. |

It will be apparent that this alloy may be formulated even from commercial reduction cell aluminum, since the aluminum content is only about 99.75% exclusive of the magnesium. The image characteristics of H25 material having the above analysis are summarized in Table 4.

TABLE 4

| Approximate Thickness of Anodic Coating (Mils) | Image Reflecting Characteristics | |
|---|---|---|
| | Quality, SRF, Percent | Brightness, SBF, Percent |
| 0.1 | 88.2 | 75.0 |
| 0.2 | 88.3 | 74.8 |
| 0.3 | 88.6 | 74.5 |
| 0.4 | 87.2 | 72.7 |
| 0.5 | 86.0 | 71.2 |
| 0.6 | 84.6 | 69.1 |
| 0.7 | 81.2 | 65.9 |
| 0.8 | 83.0 | 67.4 |
| 0.9 | 81.7 | 65.7 |
| 1.0 | 79.8 | 63.1 |

EXAMPLE IV

In order to evaluate the influence of magnesium upon the image characteristics of the finished metal, two alloys were constructed, having compositions as follows:

| | Cu | Fe | Si | Mn | Mg | Zn | Ni | Cr | Ti | Al |
|---|---|---|---|---|---|---|---|---|---|---|
| (a) | .06 | .07 | .05 | .01 | 1.95 | .01 | .00 | .01 | .01 | BAL. |
| (b) | .02 | .08 | .05 | .01 | 3.22 | .03 | .00 | .01 | .02 | BAL. |

The image characteristics for H25 temper material having compositions (a) and (b) as noted above are shown respectively in Tables 5 and 6.

TABLE 5

| Approximate Thickness of Anodic Coating (Mils) | Image Reflecting Characteristics | |
|---|---|---|
| | Quality, SRF, Percent | Brightness, SBF, Percent |
| 0.1 | 87.5 | 73.7 |
| 0.2 | 87.2 | 73.3 |
| 0.3 | 83.8 | 69.2 |
| 0.4 | 84.5 | 69.1 |
| 0.5 | 82.3 | 66.6 |
| 0.6 | 80.5 | 64.1 |
| 0.7 | 79.8 | 63.5 |
| 0.8 | 79.6 | 62.2 |
| 0.9 | 74.5 | 57.9 |
| 1.0 | 73.2 | 56.1 |

TABLE 6

| Approximate Thickness of Anodic Coating (Mils) | Image Reflecting Characteristics | |
|---|---|---|
| | Quality, SRF, Percent | Brightness, SBF, Percent |
| 0.1 | 85.4 | 72.0 |
| 0.2 | 82.0 | 68.3 |
| 0.3 | 81.5 | 67.5 |
| 0.4 | 77.1 | 63.5 |
| 0.5 | 75.9 | 61.6 |
| 0.6 | 74.6 | 60.0 |
| 0.7 | 70.5 | 56.2 |
| 0.8 | 69.9 | 55.4 |
| 0.9 | 65.3 | 51.2 |
| 1.0 | 65.0 | 50.1 |

While these readings are somewhat lower than the corresponding values for other alloys according to the present invention, having a lower magnesium content, the results are no less remarkable when comparison is made to results previously attainable. For example, an alloy having the following analysis:

| Cu | Fe | Si | Mn | Mg | Zn | Ni | Cr | Ti | Al |
|---|---|---|---|---|---|---|---|---|---|
| .10 | .06 | .05 | .01 | 3.06 | .01 | .00 | .01 | .00 | BAL. |

produced in H25 temper by conventional fabricating procedures exhibited substantially lower image characteristics, viz. from about 74 down to about 53 (SRF%) and from about 60 down to about 35 (SBF%), as the coating thickness ranged from 0.1 mil to 1 mil.

It is apparent, therefore, that novel alloys such as those of Example IV are particularly suitable for end uses which demand both high strength and good image characteristics. Previously, the image characteristics of an alloy of comparable purity were sacrificed whenever improvement of strength was essential. Similarly, previous alloys constructed to exhibit optimum image characteristics were necessarily of lower strength. The opportunity to increase the magnesium content is, therefore, a significant advantage of the present invention.

By way of summation, the present invention encompasses an improved family of alloys particularly receptive to chemical and electrolytic brightening. Also within the scope of the invention is an improved fabricating method typified by a warm-cool rolling step which has been found to contribute materially to the superior image characteristics of the novel alloys disclosed herein, as well as aluminum and other aluminum alloys generally. With respect to that aspect of the invention which relates to fabricating procedures, it has been found that optimum development of image characteristics may be achieved by use of a novel step between conventional hot and cold-rolling operations in the preparation of the metal. The intermediate rolling step may be conducted while the metal is in the temperature range from about 300–600° F. Preferably, the metal is cooled following hot-rolling to a temperature in the range of about 525–575° F., and a substantial reduction in thickness is accomplished before the metal temperature falls below about 350° F.

The alloy concept of the present invention evolves from an appreciation of the influence upon image characteristics of the various impurity constituents found in commercial reduction cell aluminum. For the purpose of improving the image characteristics of bright finished aluminum and aluminum alloys, it has been determined that the following limits are desirable: copper no more that about 0.15%, iron no more than about 0.12%, silicon no more than about .08%, others no more than about .03% each and 0.10% total. In a preferred form of the alloys according to the present invention, the limits are as follows: copper .01–.06%, iron .01–.10%, silicon .01–.08%, manganese .03% max., others .02% max. each and .05% max. total.

In order to achieve optimum physical properties of such alloys with a minimum sacrifice in image characteristics, it has been found to be satisfactory to include up to about 3% magnesium. In a preferred composition, the magnesium content ranges from about 0.40–1.20%, and optimum results are obtained when the magnesium range is approximately 0.60–1.0%.

While various present preferred embodiments of the invention have been described, it will be recognized that the invention may be otherwise variously embodied and practiced within the scope of the following claims.

I claim:

1. An aluminum alloy especially suitable for chemical and electrolytic brightening, consisting essentially of magnesium up to about 1.20%, copper, .01–.08%, manganese .03% max., iron .01–[12].*12*%, and silicon .01–.08%, in weight percent, balance aluminum.

2. An aluminum alloy especially suitable for chemical and electrolytic brightening, consisting essentially of magnesium up to about [3]*1.20%*, manganese .03% max., copper .01–.06%, iron .01–.10%, and silicon .01–.08%, in weight percent, balance aluminum.

3. An alloy according to claim 2 wherein the magnesium content is about 0.40–1.20%.

4. An aluminum alloy especially suitable for chemical and electrolytic brightening, consisting essentially of aluminum and 0.60–1.0% magnesium, manganese .03% max., copper .01–.06%, iron .01–.10%, silicon .01–.08%, in weight percent.

5. An article having a highly reflective and lustrous surface, comprising a transparent layer of aluminum oxide upon a substrate of aluminum alloy, said alloy consisting essentially of magnesium up to about 1.20%, copper .01–.08%, manganese .03% max., iron .01–.12%, and silicon .01–.08%, in weight percent, balance aluminum.

6. An article having a highly reflective and lustrous surface, comprising a transparent layer of aluminum oxide upon a substrate of aluminum alloy, said alloy consisting essentially of magnesium 0.40–1.20%, manganese .03% max., copper .01–.06%, iron .01–.10%, and silicon .01–.08%, in weight percent, balance aluminum.

7. An article having a highly reflective and lustrous surface, comprising a transparent layer of aluminum oxide upon a substrate of aluminum alloy, said alloy consisting essentially of aluminum and 0.60–1.0% magnesium, manganese .03% max., copper .01–.06%, iron .01–.10%, silicon .01–.08%, in weight percent.

8. An alloy of unrefined reduction cell aluminum and magnesium, said alloy consisting essentially of magnesium up to about [3]*1.20%*; copper .01–0.15%; iron .01–.12%; not more than about .03% manganese; silicon .01–.08%, in weight percent, balance aluminum.

9. The alloy of claim 8 having a transparent layer of aluminum oxide thereon.

10. The alloy of claim 9 further characterized by a specular reflectance factor of about 90 to 93 and a specular brightness factor of about 76–79 when said transparent layer of oxide is 0.1 mil thick and a specular reflectance factor of about 88–91 and a specular brightness factor of about 71–73 when said transparent layer of oxide is 1.0 mil thick.

11. An aluminum alloy consisting essentially of up to about [3]*1.20%* magnesium; .01–0.15% copper; .01–.12% iron; not more than about .03% manganese; and .01–.08% silicon, in weight percent, the balance essentially aluminum.

12. An aluminum alloy according to claim 11 consisting essentially of .03% copper; .08% iron; .05% silicon; .03% manganese; .80% magnesium, in weight percent, balance aluminum.

13. An aluminum alloy according to claim 11 consisting essentially of .06% copper; .07% iron; .05% silicon; .01% manganese; .75% magnesium; .01% titanium, in weight percent, balance aluminum.

14. An article having a highly reflective and lustrous surface comprising a transparent layer of aluminum oxide upon a substrate of aluminum alloy, said alloy consisting essentially of up to about [3]*1.20%* magnesium; .01–0.15% copper; .01–.12% iron; not more than about .03% manganese; and .01–.08% silicon in weight percent, the balance essentially aluminum.

15. An aluminum alloy adapted to give a brightly reflective surface when anodically coated and consisting essentially of magnesium up to about 1.20%, copper .01–.08%, manganese not in excess of 0.03%, iron .01–.12% and silicon .01–.08%, in weight percent, balance aluminum, said alloy having a specular reflectance factor in the range of about 84 to about 93 and a specular brightness factor in the range of about 69 to about 79 when anodically coated with a layer of aluminum oxide of from 0.1 to 1.0 mil thickness.

References Cited

The following references, cited by the Examiner, are of record in the patented file of this patent or the original patent.

UNITED STATES PATENTS

| | | | |
|---|---|---|---|
| 1,329,312 | 1/1920 | Roberts | 75—147 |
| 2,063,022 | 12/1936 | Beck | 148—11.5 |
| 2,067,076 | 1/1937 | Craighead | 148—11.5 |
| 2,076,575 | 4/1937 | Kempf et al. | 75—142 |
| 2,280,169 | 4/1942 | Stroup | 75—138 |
| 2,574,318 | 11/1951 | Burkhardt | 75—138 |
| 2,853,409 | 9/1958 | Helling et al. | 148—4 X |

FOREIGN PATENTS

| | | |
|---|---|---|
| 337,558 | 11/1930 | Great Britain. |
| 621,259 | 4/1947 | Great Britain. |
| 877,873 | 9/1942 | France. |

DAVID L. RECK, *Primary Examiner.*

C. N. LOVELL, *Assistant Examiner.*

Dedication

Reissue No. 26,216.—*John B. English*, Tokyo, Japan. BRIGHT FINISHED ALUMINUM ALLOY SYSTEM. Patent dated May 30, 1957. Dedication filed July 18, 1973, by the assignee, *Reynolds Metals Company*.

Hereby dedicates to the Public the entire term of said patent.

[*Official Gazette November 13, 1973.*]